Patented Aug. 13, 1940

2,210,962

UNITED STATES PATENT OFFICE 2,210,962

SULPHONIC ACIDS OF AROMATIC COMPOUNDS

Charles A. Thomas, Dayton, Ohio, assignor to The Sharples Solvents Corporation, Philadelphia, Pa., a corporation of Delaware No Drawing. Application May 18, 1939, Serial No. 274,361

5 Claims. (Cl. 260—505)

The present invention pertains to new compositions of matter consisting of novel chemical compounds and mixtures which are particularly useful as washing, wetting and emulsifying agents. In recent years, acids and esters formed by sulphonating or sulphating various organic chemicals, such as long-chain aliphatic alcohols and alkylated aromatic compounds and the alkali metal derivatives of such sulphonated and sulphated products, have found utility in this field. The familiar Gardinol and Igepon detergents are examples of such compounds.

The object of the present invention has been to provide a new group of sulphonic detergents consisting of novel chemical compounds having superior detergent qualities.

The present application is a continuation in part of my prior application, Serial No. 699,923, filed November 27, 1933, for "Washing, wetting and emulsifying agents."

The invention rests upon the production of a new group of compounds consisting of the polysulphonic acids of alkyl substituted aryl hydrocarbons containing between 8 and 20 carbon atoms in the alkyl side chains, as well as the salts of said acids, such as sodium, potassium and ammonium salts. These compounds, whether in pure form or in admixture with each other, or with other detergent compositions, possess remarkable detergent and wetting properties and are capable of reducing the surface tension of water to an unusual degree when dissolved therein.

The compounds of the invention may be produced by first alkylating the aromatic compound which is to form the nucleus of the sulphonic acid to produce an aryl compound having an alkyl side chain containing 8 to 20 carbon atoms. These alkyl substituted aryl compounds are thereafter sulphonated with an excess of sulphonating agent to produce the corresponding polysulphonic acids.

The initial alkylation reaction may be performed by condensing with the benzene, naphthalene, or other aromatic compound, an olefin or a mixture of olefins of between 8 and 20 carbon atoms. This condensation may be accomplished by the use of a Friedel-Crafts catalyst such as aluminum chloride, or it may be accomplished with the aid of sulphuric acid as the catalyst. The condensation reaction by which the olefin is condensed with benzene or naphthalene, for example, may be accomplished by mixing the desired olefin with the aryl hydrocarbon and thereafter cooling the mixture during the gradual addition of zinc chloride or aluminum chloride to the mixture while maintaining thorough agitation. After the completion of this condensation reaction, the reaction mixture is neutralized, washed and treated with sulphuric acid for removal of color. The resulting composition is then again neutralized, and the remaining mixture is thereafter washed with water and distilled under vacuum to obtain a relatively pure mixture of higher alkyl benzenes or naphthalenes.

The production of the alkyl-substituted aromatic compounds may likewise be obtained by reacting alkyl chlorides containing between 8 and 20 carbon atoms in their alkyl radicals with the aromatic hydrocarbon which is to form the nucleus of the compound in the presence of aluminum chloride, zinc chloride, or other equivalent Friedel-Crafts catalyst.

After the alkyl-substituted aromatic compound is produced as described above, it is treated with a molecular excess of a strong sulphonating agent such as oleum or chlor-sulphonic acid, the sulphonation being accomplished by adding the alkylated aryl compound gradually to the sulphonating agent while stirring and cooling the mixture. At the completion of the sulphonation reaction, water is added to the mixture and the viscous layer containing the desired sulphonic acid derivative or mixture is separated from the residue. This layer may thereafter be neutralized with sodium, potassium, or ammonium hydroxide and heated over an air bath until solid. When crushed, it yields a hygroscopic product which is almost white in color and possesses remarkable wetting and detergent properties.

Compounds of the type included within the present invention, i. e., compounds containing from 8 to 20 carbon atoms in the akyl side chains, and more than one sulphonic acid group, are very considerably superior to the homologous lower alkyl-substituted compounds and to mono-sulphonic acid derivatives of even the higher alkyl-substituted compounds with respect to these properties.

Examples

*Example 1.*—Octadecyl benzene disulphonic acid (sodium salt). 254 pounds of actadecane, obtained by a fractionation of a Michigan fuel oil, boiling between 300–330° C. is chlorinated at 90° C. in a glass-lined kettle until it has gained 35 pounds in weight. The crude octadecyl chloride is then added to 390 pounds of benzene. The mass is heated to 90° C., and 15 pounds of aluminum chloride slowly added. After the reaction has subsided, the material is refluxed for a period of four hours to complete reaction. Upon standing for one hour, the catalyst complex separates out, and upper layer consisting of a benzene solution of octadecyl benzene is removed and clarified by mixing with 5 parts of fuller's earth and filtered. The clarified solution is then distilled to remove the excess benzene, and the residue is vacuum distilled. The first cut so obtained is unchanged octadecane. The second cut, boiling at 235-270° at 15 mm., is mono-octadecyl benzene. The residue left in the still is essentially dioctadecyl benzene. In this manner about 170 pounds of mono-octadecyl benzene is obtained as a pale yellow oil.

100 pounds of octadecyl benzene is placed in a 50 gallon lead-lined kettle equipped with an agitator and cooling jacket. Maintaining the temperature at 20-20° C., 400 pounds of 40% oleum is added with good agitation. The temperature is then slowly raised to 50° C. where it is kept for a period of 2 hours. The temperature is finally raised to 60° C. where it is kept for an additional 4 hours. The crude solution of octadecyl benzene disulphonic acid is now dropped to a second lead-lined vessel containing 500 pounds of ice where it is neutralized by the addition of a slight excess of calcium hydroxide in water solution. The product is now filtered to remove the calcium sulphate. The latter is washed with an additional quantity of water to remove the greater part of the occluded calcium octadecyl benzene disulphonate. The filtrate is then treated with the requisite quantity of sodium carbonate whereby the sodium salt of the disulphonic acid is formed leaving a precipitate of calcium carbonate. The latter is removed by filtration, and the aqueous solution of the disodium octadecyl benzene disulphonate is evaporated to dryness under vacuum. In this manner approximately 70% yield of the disodium salt of octadecyl benzene disulphonic acid is obtained as an almost colorless solid. The product has excellent wetting out properties and moderate detergency.

*Example 2.*—Sodium tetradecyl naphthalene disulphonate. A cut of tetradecane, boiling between 240-260° C. and obtained by the fractionation of a Cabin Creek kerosene, is chlorinated until it contains approximately 1.1 atoms of chlorine per mol of hydrocarbon. Without further purification, this product is condensed with naphthalene in the ratio of 1 part by weight of the chloride to 2 parts of naphthalene. The catalyst employed is aluminum chloride which is used to the extent of 5 parts to 100 parts of tetradecyl chloride. When the reaction is complete, the hydrocarbon layer is removed from the catalyst complex and treated with two parts by weight of kieselguhr and filtered hot. The product is now subjected to a vacuum distillation conducted at 10 mm. until a temperature of 200° is reached. By this procedure, the excess naphthalene together with a small amount of tetradecane is removed. The residue, consisting of a mixture of mono- and di-tetradecyl naphthalene is removed and sulphonated as is in Example 1 without further purification. Upon working up the sulhponic acid, there is obtained a yield of 70% of product based upon the material sulphonated. The sodium salt is brown in color, but possesses good wetting and moderately good detergent properties.

*Example 3.*—Decyl anthracene disodium disulphonate. A cut of pure decane, boiling by the Engler between 169-173° C. and obtained by a fractionation of "Amsco special solvent," is chlorinated until it gains 12 pounds per pound mol of hydrocarbon used. 450 pounds of such a solution of decyl chloride in decane is condensed with 160 pounds of anthracene (less than the molar quantity) in the presence of aluminum chloride at 130-140° C. The hydrocarbon mass is poured off the catalyst complex and treated with three successive portions of contact clay. The material so resulting is of greatly improved color. It is then transferred to a lead-lined reactor where 600 pounds of 98% sulphuric acid is slowly added, maintaining the temperature below 40° C. When the addition is complete, the temperature is raised to 100° where it is kept for three hours. Upon cooling, the mass separates into three layers; the lower layer being diluted sulphuric acid; the middle layer, decyl naphthalene disulphonic acid; and the top layer being unchanged decane. The middle layer is removed and made neutral with sodium hydroxide solution. Upon evaporation under vacuum, the sodium anthracene disulphonic acid is obtained as a brown material which possesses good wetting out properties.

Modifications will be obvious to those skilled in the art, and I do not therefore wish to be limited except by the scope of the sub-joined claims.

I claim:

1. Chemical compounds chosen from the class consisting of poly-sulphonic acids of aryl compounds substituted on the nucleus by at least one alkyl radical containing between 8 and 20 carbon atoms, and the alkali metal salts of such acids, said compounds being useful as washing, wetting and emulsifying agents.

2. Chemical compounds chosen from the class consisting of alkyl substituted benzene, naphthalene and anthracene poly-sulphonic acids having from 8 to 20 carbon atoms in their alkyl side chains and the alkali metal salts of such acids, said compounds being useful as washing, wetting and emulsifying agents.

3. Chemical compounds chosen from the class consisting of poly-sulphonic acids of benzene substituted on the nucleus by at least one alkyl radical containing between 8 and 20 carbon atoms, and the alkali metal salts of such acids, said compounds being useful as washing, wetting and emulsifying agents.

4. Chemical compounds chosen from the class consisting of poly-sulphonic acids of naphthalene substituted on the nucleus by at least one alkyl radical containing between 8 and 20 carbon atoms, and the alkali metal salts of such acids, said compounds being useful as washing, wetting and emulsifying agents.

5. Chemical compounds chosen from the class consisting of di-sulphonic acids of aryl compounds substituted on the nucleus by at least one alkyl radical containing between 8 and 20 carbon atoms, and the alkali metal salts of such acids, said compounds being useful as washing, wetting and emulsifying agents.

CHARLES A. THOMAS.

CERTIFICATE OF CORRECTION.

Patent No. 2,210,962. August 13, 1940.

CHARLES A. THOMAS.

It is hereby certified that error appears in the printed specification of the above numbered patent requiring correction as follows: Page 1, second column, line 39, for "akyl" read --alkyl--; line 48, for "actadecane" read --octadecane--; page 2, first column, line 5, after "and" insert --the--; line 20, for "20-20° C." read --20-30° C.--; and that the said Letters Patent should be read with this correction therein that the same may conform to the record of the case in the Patent Office.

Signed and sealed this 15th day of October, A. D. 1940.

Henry Van Ársdale,
Acting Commissioner of Patents.

(Seal)